United States Patent Office 2,823,145
Patented Feb. 11, 1958

2,823,145

FLAMEPROOFING WITH ALKALI METAL FLUORIDE AND A MEMBER OF THE GROUP CONSISTING OF BORIC ACID AND ANHYDRIDE

Norval D. Clare, Niagara Falls, N. Y., and Alden J. Deyrup, West Chester, Pa., assignors to E. I. du Pont de Nemours and Company, Wilmington, Del., a corporation of Delaware No Drawing. Application March 21, 1956
Serial No. 572,794

22 Claims. (Cl. 117—138)

This invention relates to flameproofing. In one aspect it relates to the use of certain complex inorganic compounds as flameproofing agents. Is another aspect it relates to cellulosic or other initially flammable article carrying one or more of the complex compounds as a flameproofing agent.

This application is a continuation-in-part of our co-pending application Serial No. 369,712, filed July 22, 1953, now abandoned, which in turn was a continuation-in-part of application Serial No. 281,685, filed April 10, 1952, and also now abandoned.

Processes are known which utilize materials such as boric acid, borax and sodium silicate as flameproofing agents for paper, textiles and the like. These compounds are cheap and easily applied from aqueous solutions. They suffer, however, from various disadvantages. Sodium silicate, for example, is too alkaline for applications where the article involved cannot tolerate alkalinity. Boric acid and borax, on the other hand, have only limited solubility in water. All of the compounds mentioned tend, moreover, to deposit as crystalline powders which may be dusted off the material protected. Ammonium sulfamate has been proposed to avoid most of the disadvantages mentioned but this material is quite expensive.

A primary object of the present invention is therefore provision of a novel and improved process for flameproofing cellulosic or other flammable fibers.

A further object is provision of initially flammable bases flameproofed with novel inorganic agents.

The above-mentioned and yet further objects are achieved in accordance with this invention by a process in which the anhydrous or hydrated addition products of an alkali metal fluoride and a member of the group consisting of boric acid and boric anhydride are employed as flameproofing agents. Potassium fluoride is suitable in forming these addition products but sodium fluoride is preferred. The sodium compound in particular is discussed in application Serial No. 281,685.

Sodium oxyfluoborate, with which the potassium compound is analogous, has the simple formula

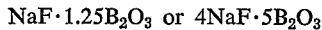
$NaF \cdot 1.25 B_2O_3$ or $4NaF \cdot 5B_2O_3$

It is prepared by fusing sodium fluoride and boric anhydride in the proper stoichiometric ratio or by removing water from a hydrate. The hydrates, which may contain up to one mole of water for each mole of boric oxide, are formed by reacting sodium fluoride and boric acid in the absence or presence of water or by adding water to the anhydrous compound.

Both the anhydrous material and the hydrate are quite unusual in being miscible with water at ambient temperature. The addition reaction is thus, in effect, a mutual solubilization. The solids form thick viscous aqueous solutions which can be drawn to filaments or evaporated to thin, varnish-like glassy films. The anhydrous compound is a clear, non-crystalline glass of high molecular weight reversibly melting to a clear glassy liquid at about 700° C. The sodium compound may be referred to as a sodium oxyfluoborate polymer or complex or more simply as sodium oxyfluoborate. Except for the melting point, the properties of the solid are not influenced greatly by the presence of up to about one mole of water per mole of boric oxide but larger amounts tend to yield solutions at ambient temperature.

The oxyfluoborate and its hydrates are extremely effective agents for flameproofing cellulosic and other inflammable materials. The quantity required is not sharply critical. In a lower limit for effective flameproofing, the oxyfluoborate comprises about 5–8% by weight of the material treatetd. It may, however, weigh up to about 60% as much as the base protected. Around 10% by weight is generally preferred. Since the quantity needed depends on several factors as will be evident hereinafter, it may be referred to most simply as "an effective flameproofing amount."

The oxyfluoborate may be applied to the flammable base in any convenient method as, for example by (1) impregnation, (2) coating or (3) admixture. The quantity utilized for effective flameproofing will depend to some extent on the manner in which it is applied.

In perhaps the simplest process, impregnation, the base is merely dipped into an aqueous solution until it has absorbed a sufficient amount of the agent. This procedure is particularly effective, and is preferred, with thin, flexible bases which readily absorb water. Such bases include paper and textiles made from cellulose, cotton, wool, linen, artificial fibers and the like.

Aqueous solutions suitable for use in the dipping process may contain between about 5 and 75% by weight of the oxyfluoborate pentahydrate. A concentration of about 10–25% by weight is preferred.

The contact time required to flameproof a base by dipping is largely dependent on the nature of the base. There is generally no preferential absorption of either water or solute. Consequently a contact period long enough to wet the base thoroughly will impregnate the base with the maximum quantity of flameproofing agent that can be obtained from a given solution concentration. Textiles or paper need only to be passed slowly through a 10–25% solution to absorb sufficient of the flameproofing agent, i. e. a weight content of oxyfluoborate of 5–10%.

As a final step in the dipping process of flameproofing, the base is generally dried. This step is generally accomplished at an elevated temperature, i. e. up to about 100° C., to expedite matters but ambient temperature can be used.

Application of the agent as a coating is almost essential where the base is wood, a web of fiberboard or any other material which does not readily absorb water. Thick solutions are preferred for this treatment since there is little penetration below the surface of the base. It is difficult to adhere a weight of oxyfluoborate greater than about 2% the weight of the base by coating. A greater weight is, however, usually unnecessary since a relatively thin coating will seal the base from contact with air. Slurries containing undissolved reactants, sodium fluoride especially, may also be used in the coating process but are less preferred since the precipitate deposits unevenly and may not adhere to the base.

The oxyfluoborates are compatible with, or inert towards, dextrin and starch both in solution and in the solid state. Compositions containing such materials can therefore be formulated to improve adhesion. When an adhesive is used with sodium oxyfluoborate, it should comprise at least about 10% of the coating composition but larger amounts up to about 50% can be used as desired. The flame resistance of the material progressively decreases as the proportion of adhesive increases.

The flameproofing agents of the invention can also be used with pigments such as titanium dioxide, Prussian blue, iron oxide and the like and with inert carriers or fillers such as calcium carbonate. All can be added to and applied in paints, water-based paints in particular.

The final step in the coating process, as in the impregnation process, is drying the metal. Drying temperatures are again not critical but use of elevated temperature is preferred.

While the oxyfluoborates are preferably utilized in solution, the third method of adding them to a base, admixture, may be employed in molding or other shaping operations. The flameproofing compounds are mixed with the finely divided material serving as the basis of the molded object and the mixture shaped or extruded. The base is then set in the normal fashion. Phenol-formaldehyde resins or comminuted cellulose containing a binder are examples of usable bases. The oxyfluoborate should comprise about 5–10% of the solid with which it is admixed. Anhydrous oxyfluoborates are particularly effective when employed in admixture.

Solutions containing other than exact $NaF:B_2O_3$ mole ratios of 1:1.25 also yield good results in flameproofing. Dilute solutions containing the oxyfluoborate dissolve an excess of either of the components. In fact, initially clear solutions can be made up from the water bound in the boric acid when solid sodium fluoride and solid boric acid are reacted in the $NaF:B_2O_3$ mole ratio range of about 1:1.17 to 1:1.45. Such solutions are as effective as those containing the oxyfluoborate alone. As noted previously slurries carrying an undissolved excess of either constituent can also be used. Since the slurries tend to waste the excess, they are generally filtered before use.

Solids varying from the exact molar ratios are also acceptable, particularly when an extrusion or other molding operation is carried out. In fact, $NaF$ and $B_2O_3$ powders may separately be added to the molding composition in rough stoichiometric ratio if it is so desired. Setting the base in accordance with usual practice, i. e. by allowing it to stand, by applying heat, or otherwise, will generally form the oxyfluoborate.

The discussion of flameproofing has been largely restricted to the sodium oxyfluoborates. It will readily be understood that the corresponding compounds of the other alkali metals, potassium in particular, can also be used.

Details of the invention will be evident from the illustrative, but not restrictive, examples which follow. In these examples all percentages are weight percentages. The formula of the sodium oxyfluoborate utilized was $4NaF \cdot 5B_2O_3 \cdot 5H_2O$ unless otherwise noted.

Example 1

Samples of muslin were dipped in 5, 10 and 20% solutions of sodium oxyfluoborate and samples of duck in 4, 8 and 16% solutions thereof. The samples were tested for flame resistance according to the 45° angle procedure of Ind. and Eng. Chem. 42, 421–23 (1950). Pieces of the same cloth were treated with a commercial flameproofing material largely consisting of ammonium sulfamate, at 14–15% concentration and used as controls. The test samples treated with the higher concentrations of sodium oxyfluoborate gave results comparable with samples treated with the commercial agent in showing no afterflame or afterglow. All samples tested exhibited approximately the same char area.

Example 2

A 6″ x 9″ panel of ¼″ thick birch plywood was painted on both sides with a 50% aqueous solution of sodium oxyfluoborate and dried for 16 hours at room temperature to give a total dry loading of 8%. When this sample was placed above a Meeker burner so that the flame barely touched the under surface of the panel for a period of five minutes, a slight charring on the exposed side only was evident. An untreated piece of plywood burned completely through and was aflame under the same conditions at the end of five minutes.

Example 3

Pieces of commercial cellulosic wallboard about ¼″ thick were separately coated with three composition samples. The first sample contained 25 parts of sodium oxyfluoborate, 75 parts of water and 15 parts of starch. The second sample contained 25 parts of sodium oxyfluoborate, 75 parts of water, 15 parts of starch and 25 parts of titanium dioxide pigment. The third sample was simply a 66% aqueous solution of sodium oxyfluoborate. All three samples were of good painting consistency and were applied as paints in two coats. The first coat was allowed to dry 16 hours at ambient temperature. The second was dried overnight at ambient temperature. Coated panels placed horizontally over the flame of a Meeker burner resisted the propagation of flame therethrough for several minutes.

Example 4

Pieces of ordinary laboratory filter paper were impregnated with sodium oxyfluoborate by dipping in dilute aqueous solutions to give dry loadings of 5–50% by weight. Samples containing 10% or more of the complex sodium oxyfluoborate effectively resisted burning when contacted with open flame.

Example 5

The experiment of Example 4 was substantially repeated except that cotton fabric was substituted for the filter paper. Results obtained were the same as with the filter paper.

Example 6

A formulation comprising one part of sodium oxyfluoborate, one part of water and three parts of sawdust was placed in a bottle and mixed thoroughly by rolling. Ten-gram portions of this impregnated sawdust were placed between aluminum foil and pressed in a Carver press at 110° C. for 10 minutes. The resulting rigid sheet of pressed sawdust would not burn when contacted with a free flame.

Example 7

Flameproof molded articles were obtained in a manner similar to that described for sawdust in Example 6 by using a mixture of 150 grams of "Solka Floc" (finely divided α-cellulose) and 50 grams of a 50% solution of sodium oxyfluoborate.

Example 8

Sodium fluoride and boric anhydride were fused together at around 700° C. to form an addition product having the $NaF:B_2O_3$ mole ratio of 1:1. Part of this product was dissolved in water in amount calculated to yield a 50% solution on complete dissolution. A slurry resulted, excess $NaF$ failing to dissolve. Muslin samples dipped in the slurry at room temperature until saturated were found to be flameproofed as well as the muslin treated above.

Having described our invention, we claim:

1. An article of manufacture comprising an initially inflammable base rendered flameproof by treatment with the water-soluble product of the reaction between the fluoride of an alkali metal and a member of the group consisting of boric acid and anhydride.

2. The article of claim 1 in which the alkali metal: boric anhydride ratio of the product of reaction is between about 1:1.17 and 1:1.45.

3. An article of manufacture comprising a cellulosic base rendered flameproof by treatment with a composition containing sodium fluoride and boric anhydride in a mole ratio varying between about 1:1.17 and 1:1.45.

4. The article of claim 3 in which said composition contains additionally water in a sodium fluoride:water mole ratio of up to about 1:1.25.

5. An article of manufacture comprising an inflammable base impregnated with sodium oxyfluoborate.

6. An article of manufacture comprising an inflammable base impregnated with at least 5–10% by weight of sodium oxyfluoborate.

7. The article of claim 6 in which the inflammable base is cellulosic.

8. The article of claim 7 in which the inflammable base is fibrous.

9. Cellulosic paper flameproofed by impregnation with about 10% by weight of a composition comprising, in solution, sodium fluoride and a member of the group consisting of boric acid and boric anhydride.

10. A textile flameproofed by impregnation with about 10% by weight of a composition comprising sodium fluoride and a member of the group consisting of boric anhydride and boric acid.

11. An article of manufacture comprising an inflammable base coated with a formulation containing a water-soluble addition product of an alkali metal fluoride and a member of the group consisting of boric anhydride and boric acid.

12. An article of manufacture comprising an inflammable base coated with a formulation containing the water-soluble product of reaction between sodium fluoride and a member of the group consisting of boric anhydride and boric acid.

13. An article of manufacture comprising a cellulosic base protected by a flameproofing paint comprising sodium oxyfluoborate and a pigment.

14. A paint for flameproofing initially inflammable bases which contains the addition product of the fluoride of an alkali metal and a member of the group consisting of boric anhydride and boric acid.

15. The paint of claim 14 in which the alkali metal is sodium.

16. The method of flameproofing a fabric which comprises impregnating the fabric with at least about 5% of its weight of sodium oxyfluoborate from an aqueous solution thereof.

17. The method of flameproofing an inflammable cellulosic base which comprises coating said base with sodium oxyfluoborates from an aqueous solution thereof.

18. The method of claim 17 in which the solution is a paint carrying additionally a pigment.

19. The method of producing a flameproofed composition which comprises (1) admixing powders capable of setting to form a flammable object with the comminuted reaction product of sodium fluoride and a member of the group consisting of boric anhydride and boric acid and (2) setting the resulting mixture.

20. The method of claim 19 in which the mixture is shaped before setting.

21. The method of flameproofing an initially-flammable base which comprises supplying thereto the water-soluble product of the reaction between the fluoride of an alkali metal and a member of the group consisting of boric acid and anhydride.

22. An article of manufacture comprising an initially-flammable base made flameproof by the addition thereto of the water-soluble product of the reaction between the fluoride of an alkali metal and a member of the group consisting of boric acid and anhydride.

References Cited in the file of this patent

UNITED STATES PATENTS 2,420,644   Athy et al. _____ May 20, 1947

OTHER REFERENCES

Ryss et al.: "J. Applied Chemistry," U. S. S. R., vol. 25, February 1952, pages 157–161, inclusive. (Copy in file (abandoned) S. N. 469,924, filed November 15, 1954.)

U. S. DEPARTMENT OF COMMERCE
PATENT OFFICE

CERTIFICATE OF CORRECTION

Patent No. 2,823,145                                February 11, 1958

Norval D. Clare et al.

It is hereby certified that error appears in the printed specification of the above numbered patent requiring correction and that the said Letters Patent should read as corrected below.

Column 1, line 17, for "Is another" read --In another--; column 3, line 9, for "metal" read --material--.

Signed and sealed this 8th day of April 1958.

(SEAL)
Attest:
KARL H. AXLINE
Attesting Officer

ROBERT C. WATSON
Commissioner of Patents